United States Patent
Fairgrieve et al.

(10) Patent No.: US 9,701,308 B2
(45) Date of Patent: *Jul. 11, 2017

(54) VEHICLE SPEED CONTROL SYSTEM

(71) Applicant: Jaguar Land Rover Limited, Whitley Coventry Warwickshire (GB)

(72) Inventors: Andrew Fairgrieve, Rugby (GB); James Kelly, Solihull (GB); Daniel Woolliscroft, Birmingham (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/421,942

(22) PCT Filed: Aug. 15, 2013

(86) PCT No.: PCT/EP2013/067076
§ 371 (c)(1),
(2) Date: Feb. 16, 2015

(87) PCT Pub. No.: WO2014/027061
PCT Pub. Date: Feb. 20, 2014

(65) Prior Publication Data
US 2015/0217769 A1 Aug. 6, 2015

(30) Foreign Application Priority Data

Aug. 16, 2012 (GB) .................................. 1214651.0
Mar. 11, 2013 (GB) .................................. 1304312.0

(51) Int. Cl.
*B60W 30/14* (2006.01)
*B60K 28/16* (2006.01)
(Continued)

(52) U.S. Cl.
CPC .......... *B60W 30/143* (2013.01); *B60K 28/16* (2013.01); *B60K 31/02* (2013.01); *B60K 31/04* (2013.01);
(Continued)

(58) Field of Classification Search
CPC ............ F16H 59/66; F16H 2061/0234; F16H 61/0213; B60W 10/11; B60W 2520/26;
(Continued)

(56) References Cited

U.S. PATENT DOCUMENTS 4,953,093 A 8/1990 Etoh
4,987,966 A 1/1991 Fujita
(Continued)

FOREIGN PATENT DOCUMENTS

CN 102458944 A 5/2012
DE 10241455 A1 3/2004
(Continued)

OTHER PUBLICATIONS

International Search Report for application No. PCT/EP2013/067076, dated Oct. 23, 2013, 4 pages.
(Continued)

*Primary Examiner* — Yuen Wong
(74) *Attorney, Agent, or Firm* — Reising Ethington P.C.

(57) ABSTRACT

A vehicle speed control system for a vehicle having a plurality of wheels, the vehicle speed control system comprising: means for receiving a user input of a target speed at which the vehicle is intended to travel; and means for commanding application of torque to one or more wheels of the vehicle, wherein the system is configured such that when it is required to accelerate the vehicle to achieve the target speed and the system detects a wheel slip event, the system is operable temporarily to suspend further acceleration of the vehicle.

24 Claims, 8 Drawing Sheets

(51) Int. Cl.
*B60K 31/02* (2006.01)
*B60K 31/04* (2006.01)
*B60T 8/175* (2006.01)
*F16H 61/02* (2006.01)
*B60W 10/11* (2012.01)
*B60W 10/184* (2012.01)
*B60W 30/18* (2012.01)
*F16H 59/66* (2006.01)

(52) U.S. Cl.
CPC ............. *B60T 8/175* (2013.01); *B60W 10/11* (2013.01); *B60W 10/184* (2013.01); *B60W 30/18172* (2013.01); *F16H 61/0213* (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 2520/26* (2013.01); *B60W 2520/30* (2013.01); *B60W 2550/141* (2013.01); *B60W 2720/30* (2013.01); *B60Y 2200/20* (2013.01); *F16H 59/66* (2013.01); *F16H 2061/0234* (2013.01)

(58) Field of Classification Search
CPC ..... B60W 2550/141; B60W 30/18172; B60W 30/143; B60W 2520/30; B60W 2720/30; B60W 10/184; B60W 2520/10; B60K 31/02; B60K 28/16; B60K 31/04; B60T 2210/14; B60T 2210/16; B60T 2201/04; B60T 2220/04; B60T 2260/06; B60T 8/175; B60Y 2200/20
See application file for complete search history.

(56) References Cited

U.S. PATENT DOCUMENTS

| 7,349,776 B2 | 3/2008 | Spillane et al. |
| 8,620,557 B2 | 12/2013 | Johansson et al. |
| 2003/0234126 A1 | 12/2003 | Schmitt et al. |
| 2004/0084237 A1 | 5/2004 | Petrie, Jr. |
| 2005/0101438 A1* | 5/2005 | Cring ................. B60K 23/0808 477/174 |
| 2009/0069993 A1* | 3/2009 | Inoue .................... B60W 40/06 701/70 |
| 2009/0255746 A1 | 10/2009 | Boesch |
| 2011/0257858 A1 | 10/2011 | Kobayashi et al. |

FOREIGN PATENT DOCUMENTS

| EP | 0425276 A2 | 5/1991 |
| GB | 2276683 A | 3/1994 |
| GB | 2454337 A | 5/2009 |
| JP | S61188235 A | 8/1986 |
| JP | H0723070 B2 | 3/1995 |
| JP | 2001287559 A | 10/2001 |
| JP | 2008018874 A | 1/2008 |
| JP | 2011178185 A | 9/2011 |
| WO | WO2008024217 A2 | 2/2008 |
| WO | WO2012149250 A2 | 11/2012 |

OTHER PUBLICATIONS

UK Combined Search and Examination Report for corresponding application No. 1304312.0, dated Aug. 14, 2013, 7 pages.
Written Opinion for application No. PCT/EP2013/067076, dated Oct. 23, 2013, 5 pages.
Notice of Reasons for Rejection, in Japanese with English summary, corresponding to JP application No. 2015-526989, dated Mar. 29, 2016, 9 pages.
International Search Report for International application No. PCT/EP2013/067064, dated Oct. 23, 2013, 4 pages.
Written Opinion for International application No. PCT/EP2013/067064, dated Oct. 23, 2013, 5 pages.
English translation of Chinese Office Action for CN application No. 201380053674.1, dated Jul. 26, 2016, 9 pages.
Japanese Office Action in Japanese with English translation for JP application No. 2015-526988, dated Nov. 8, 2016, 7 pages.
Combined Search and Examination Report for GB application No. GB1304310.4, dated Aug. 14, 2013, 7 pages.

* cited by examiner

VEHICLE SPEED CONTROL SYSTEM

FIELD OF THE INVENTION

The invention relates to a system for controlling the speed of a vehicle. In particular, but not exclusively, the invention relates to a system for centering the speed of a land-based vehicle which is capable of driving in a variety of different and extreme terrains and conditions. Aspects of the invention relate to a system, to a method and to a vehicle.

The content of co-pending UK patent application no GB1214651.0 is hereby incorporated by reference.

BACKGROUND TO THE INVENTION

In known vehicle speed control systems, typically referred to as cruise control systems, the vehicle speed is maintained on-road once set by the user without further intervention by the user so as to improve the driving experience for the user by reducing workload.

The user selects a speed at which the vehicle is to be maintained, and the vehicle is maintained at that speed for as long as the user does not apply a brake or, in some systems, the clutch. The cruise control system fakes its speed signal from the driveshaft or wheel speed sensors. When the brake or the clutch is depressed, the cruise control system is disabled so that the user can change the vehicle speed without resistance from the system. If the user depresses the accelerator pedal the vehicle speed will increase, but once the user removes his foot from the accelerator pedal the vehicle reverts to the pre-set cruise speed.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is defected by the radar detection system, the system sends a signal to the engine or the braking system to slow the vehicle down accordingly.

Such systems are usually operable only above a certain speed, typically around 15-20 mph, and are ideal in circumstances in which the vehicle is traveling in steady traffic conditions, and particularly on highways or motorways, in congested traffic conditions, however, where vehicle speed tends to vary widely, cruise control systems are ineffective, and especially where the systems are inoperable because of a minimum speed requirement. A minimum speed requirement is often imposed on cruise control, systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

It is also known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)®System or controller.

SUMMARY

Embodiments of the invention may be understood with reference to the appended claims.

Aspects of the present invention provide a system, a vehicle and a method.

It is with a view to addressing the aforementioned limitations of existing systems that the present invention provides, in an aspect of the invention for which protection is sought, a vehicle speed control system for a vehicle having a plurality of wheels, the vehicle speed control system comprising: means for receiving a user input of a target speed at which the vehicle is intended to travel; and means for commanding application of toque to one or more wheels of the vehicle, wherein the system is configured such that when it is required to accelerate the vehicle to achieve the target speed and the system detects a wheel slip event, the system is operable temporarily to suspend further acceleration of the vehicle. Thus, a further increase in speed of the vehicle towards the target speed set by the user is prevented.

In another aspect of the invention for which protection is sought there is provided a vehicle speed control system for a vehicle having a plurality of wheels, the vehicle speed control system comprising: means for receiving a user input of a target speed at which the vehicle is intended to travel; and means for commanding application of torque to one or more wheels of the vehicle, wherein the system is configured such that when it is required to accelerate the vehicle to achieve the target speed and the system defects a wheel slip event, the system is operable temporarily to maintain the vehicle speed at a value substantially equal to that at which it was traveling when the wheel slip event was detected. Thus, a further increase in speed of the vehicle towards the target speed set by the user is prevented.

The system may be operable to maintain the vehicle at the target speed once the target speed has been achieved independently of a slip detection output signal indicating slip of one or more wheels exceeds a prescribed value.

A characteristic of existing vehicle speed control systems, also known as cruise control systems, which makes them incompatible with use off-road is that the systems cancel speed control when the vehicle detects a wheel slip event at one or more wheels. Existing systems cancel upon activation of the anti-lock braking system (ABS), the traction control system or stability control systems or the like. Whilst the approach taken by known cruise control systems may be entirely appropriate for driving on the highway, it makes these 'on-highway' cruise control systems unreliable and entirely inappropriate for use in most off-road driving situations, where the driving speed is typically much lower and the varied nature of the terrain tends to give rise to frequent slip events.

In other words, for driving in adverse and slippery conditions off-road, where wheel slip is not uncommon, on-highway cruise control systems are ineffective.

It is one benefit of some embodiments of the present invention that they provide a speed-based control which enables the user to select a very low target speed at which the vehicle progresses without any pedal inputs being required by the user once the vehicle is moving and, moreover, which is not disabled upon activation of any of the vehicle slip control mechanisms. In particular, this enables the speed of the vehicle to be controlled in driving conditions where wheel slip may occur relatively frequently, such as on slippery or icy terrain, but where low speed progress of the vehicle is still desirable.

It is a further benefit of some embodiments of the present invention that as the user does not have to concentrate on regulating the speed of the vehicle, it is easier to focus on navigational aspects such as route planning and obstacle avoidance. This is particularly advantageous when the terrain over which the vehicle is traveling is challenging to navigate, such as, for example, for off-road terrains (such as sand, rock, gravel) or in conditions such as ice or snow or where the vehicle is being driven through deep water, where the demands on user concentration are greater.

In an aspect of the invention for which protection is sought there is provided a vehicle speed control system for a vehicle having a plurality of wheels, the vehicle speed control system comprising:
 means for applying torque to at least one of the plurality of wheels;
 means for detecting a slip event between any one or more of the wheels and the terrain over which the vehicle is traveling when the vehicle is in motion and for providing a slip detection output signal in the event thereof; and
 means for receiving a user input of a target speed at which the vehicle is intended to travel,
 wherein the system is configured such that when it is required to accelerate the vehicle to achieve the target speed and the system detects a wheel slip event, the system is operable temporarily to suspend acceleration of the vehicle.

In an aspect of the invention for which protection is sought there is provided a vehicle speed control system for a vehicle having a plurality of wheels, the vehicle speed control system comprising:
 means for applying torque to at least one of the plurality of wheels;
 means for detecting a slip event, between any one or more of the wheels and the terrain over which the vehicle is traveling when the vehicle is in motion and for providing a slip detection output signal in the event thereof; and
 means for receiving a user input of a target speed at which the vehicle is intended to travel,
 wherein the system is configured such that when it is required to accelerate the vehicle to achieve the target speed and the system detects a wheel slip event, the system is operable temporarily to maintain the vehicle at a speed substantially equal to that at which it was traveling when the wheel slip event was detected.

This feature has the advantage that degradation of a surface over which the vehicle is traveling may be reduced. This is because the control system recognises that the surface is at least temporarily incapable of supporting acceleration of the vehicle at the desired rate. In response, the control system suspends attempts to accelerate the vehicle to the target speed and maintains the speed of travel of the vehicle at a value substantially equal to the speed at which the slip event was first defected.

It is to be understood that by the term wheel slip event is meant an event in which the amount of slip of one or more wheels exceeds a prescribed value.

Advantageously the system may be configured automatically to resume acceleration of the vehicle once a prescribed one or more conditions are met.

The prescribed one or more conditions may be selected from amongst the conditions that the slip event has ceased, that the vehicle has traveled a proscribed distance or for a prescribed time period since a slip event involving one or more wheels ceased, and that the vehicle has traveled a prescribed distance or for a prescribed time period since a slip event involving one or more leading wheels ceased.

By leading wheel is meant a wheel that is forward of a following wheel with respect to a direction of travel of a vehicle.

Advantageously the prescribed one or more conditions may include the condition that the vehicle has traveled a prescribed distance since the slip event involving one or more leading wheels ceased, the prescribed distance corresponding to a distance between leading and following wheels of the vehicle (such as being substantially equal to this distance, or a multiple thereof such as 1.5, 2 or any other suitable value) or that the vehicle has traveled for a prescribed time period since the slip event involving one or more leading wheels ceased, the prescribed time period corresponding to the time required for the following wheels to reach the position at which the slip event involving the one or more leading wheels ceased. The prescribed time period may correspond to the time required for the vehicle to travel a distance substantially equal to that between forward and leading wheels, or to a multiple thereof such as 1.5, 2 or any other suitable value.

This feature has the advantage that resumption of any required increase in net torque to one or more driven wheels will not take place until the following wheels of the vehicle have reached or passed the location at which slip of the leading wheel or wheels ceased. This reduces a risk that the following wheel or wheels experience slip over the same area of terrain that caused a leading wheel to slip. It is to be understood that if a following wheel slips over the same area as a leading wheel, that area may suffer increased degradation rendering the area more difficult to pass by following vehicles.

The system may be configured to maintain a substantially constant speed in the event that further acceleration is temporarily suspended.

Advantageously the substantially constant speed may correspond to the speed at which the vehicle was traveling when the slip event was detected.

The system may be configured to resume acceleration at a prescribed rate.

The prescribed rate may correspond to the rate of acceleration of the vehicle when the slip event was detected.

In other words, the system may limit the rate of acceleration of the vehicle to that experienced by the vehicle when the slip event was first detected. Thus the system ensures that the rate of acceleration does not exceed this rate.

Advantageously the means for maintaining the vehicle speed at the target speed includes: means for determining a current speed at which the vehicle is traveling; means for comparing the current speed with the target speed and for providing an output indicative of the difference between the current speed and the target speed; and means for evaluating the torque to be applied to at least one of the vehicle wheels in dependence on the output.

The control system may be operable to command application of torque to at least two wheels of the vehicle substantially simultaneously.

The control system may be operable to command application of torque to at least four wheels of the vehicle substantially simultaneously.

The system may further comprise means for inhibiting operation of the vehicle control system in the event that the current speed is determined to be in excess of a predetermined threshold speed.

The predetermined threshold speed may be between 25 and 35 kph.

The predetermined threshold speed may be substantially 30 kph.

Advantageously the predetermined threshold speed is a first, lower threshold speed, the vehicle speed control system further comprising: means for comparing the current vehicle speed with a second, higher threshold speed and, if the current vehicle speed is less than the second, higher threshold speed, holding the vehicle speed control system in a wait state and initiating vehicle speed control only once the current vehicle speed is reduced to below the first, lower threshold speed.

Further advantageously the system may be operable to assume a cancelled state when the speed exceeds the second, higher threshold speed. The cancelled state differs from the wait state in that if the speed subsequently falls below the first threshold whilst the system is in the cancelled state, initiation of vehicle speed control does not take place.

The vehicle speed control system may further comprise a cruise control system which is operable to maintain vehicle speed at speeds above the predetermined threshold speed.

The cruise control system may comprise means for suspending acceleration of the vehicle on receiving the slip detection output signal. In some embodiments, acceleration may be suspended if the slip detection signal indicates slip exceeds a predetermined threshold.

The system may further comprise: means for detecting the nature of the terrain over which the vehicle is traveling; means for determining whether the target speed is appropriate for the nature of the terrain over which the vehicle is traveling; and means for maintaining the vehicle at the target speed by commanding application of torque to the at least one of the plurality of wheels only if the target speed is determined to be appropriate by the system. Optionally, the system may be operable to determine an appropriate target speed and to maintain the vehicle at the appropriate target speed if the appropriate target speed is lower than the target speed set by the user.

Optionally, the control system may be configured to suspend acceleration only upon detection of a slip event that exceeds a value set in dependence on the nature of the terrain detected, e.g. terrain type according to a prescribed terrain classification. For example, in a mode suitable for driving over sand acceleration may be suspended at a higher rate of slip than in a mode suitable for driving over grass, where surface degradation may occur more readily.

In an aspect of the invention for which protection is sought there is provided a vehicle speed control system for a vehicle having a plurality of wheels, the vehicle control system comprising: means for applying torque to at least one of the plurality of wheels; means for detecting a slip event between any one or more of the wheels and the ground over which the vehicle is traveling and for providing a slip detection output signal in the event thereof; and means for receiving a user input of a target speed at which the vehicle is intended to travel, wherein the system is configured such that when it is required to accelerate the vehicle to achieve the target speed and the system detects a wheel slip event during acceleration of the vehicle to achieve the target speed, the system is operable temporarily to suspend further acceleration of the vehicle.

The control system may suspend further acceleration until the slip event is no longer detected.

The control system may be configured to suspend acceleration only when it is determined that the vehicle is moving.

The system may be operable to resume acceleration at a rate not exceeding that at which the vehicle was accelerating when the slip event was detected once the slip event is no longer detected.

The system may be configured not to exceed this rate of acceleration before the new target speed is reached.

The system may be operable to monitor a coefficient of surface friction between a wheel and the driving surface. The system may be operable to allow acceleration of the vehicle without imposing the limitation described above in the event that the system determines that the coefficient of surface friction exceeds a prescribed value. Thus, if the system determines that the driving surface is now capable of supporting a higher rate of acceleration than that which is currently allowed, the system may lift the limitation that the vehicle cannot accelerate at a rate exceeding that experienced by the vehicle when the slip event was first detected. It is to be understood that the system may still impose a limit on the maximum allowable rate of acceleration for safety purposes, e.g. 1.25 ms$^{-2}$. Other values are also useful.

Optionally, the system may impose a limit on allowable rate of acceleration of the vehicle in dependence on the nature of the terrain over which the vehicle is traveling; the nature of the terrain may be defected automatically by the control system in some embodiments, or set manually by a user.

The system may be operable to resume acceleration at a rate substantially equal to that at which the vehicle was accelerating when the slip event was detected once the slip event is no longer detected.

In a further aspect of the invention for which protection is sought there is provided a vehicle comprising a control system according to a preceding aspect.

In a still further aspect of the invention for which protection is sought there is provided a method of controlling a speed of a vehicle having a plurality of wheels, the method comprising: applying torque to at least one of the plurality of wheels; detecting a slip event between any one or more of the wheels and a surface over which the vehicle is traveling when the vehicle is in motion and providing a slip detection output signal in the event thereof; receiving a user input of a target speed at which the vehicle is intended to travel; and accelerating the vehicle to achieve the target speed, whereby in the event a wheel slip event is detected, the method comprises suspending temporarily further acceleration of the vehicle.

Further acceleration of the vehicle may be suspended by suspending an increase in powertrain torque delivered to one or more wheels to accelerate the vehicle. Other arrangements are also useful.

In a still further aspect of the invention for which protection is sought there is provided a method of controlling a speed of a vehicle having a plurality of wheels, the method comprising: applying torque to at least one of the plurality of wheels; detecting a slip event between any one or more of the wheels and a surface over which the vehicle is traveling when the vehicle is in motion and providing a slip detection output signal in the event thereof; receiving a user input of a target speed at which the vehicle is intended to travel; and accelerating the vehicle to achieve the target speed, whereby in the event a wheel slip event is detected, the method comprises maintaining the vehicle at a speed substantially equal to that at which it was traveling when the wheel slip event was detected.

The method may comprise resuming acceleration of the vehicle when the slip event is no longer detected. Resumption of acceleration may be accomplished by resuming a request for an increase in powertrain torque delivered to one or mere wheels. Other arrangements are also useful.

The method may comprise resuming acceleration of the vehicle subsequent to detection of the slip events the step of resuming acceleration comprising resuming acceleration at a rate corresponding to that of the vehicle when slip was first detected.

In one aspect of the invention for which protection is sought there is provided a vehicle speed control system for a vehicle having a plurality of wheels, the vehicle speed control system comprising means for applying a torque to at least one of the plurality of wheels; means for defecting a slip event between any one or more of the wheels and the ground over which the vehicle is traveling when the vehicle is in motion and for providing a slip detection output signal in the event thereof; and means for receiving a user input of a target speed at which the vehicle is intended to travel, wherein when the system is required to accelerate the vehicle to achieve the target speed and the system defects a wheel slip event, the system is operable temporarily to suspend further acceleration of the vehicle.

The system may comprise means for maintaining the vehicle at the target speed independently of the slip detection output signal.

In one aspect of the invention for which protection is sought there is provided a speed control system operable in an off-highway condition in which the system commands a powertrain to deliver a required torque to one or more wheels of the vehicle to maintain a prescribed set-speed over ground, in the event slip exceeding a prescribed value is detected when the system is accelerating the vehicle to a new set-speed, the system being operable automatically to suspend acceleration.

In a further aspect of the invention for which protection is sought there is provided a speed control system operable in an off-highway condition in which the system commands a powertrain to deliver a required torque to one or more wheels of the vehicle to maintain a prescribed set-speed over ground, in the event slip exceeding a prescribed value is detected when the system is accelerating the vehicle to a new set-speed, the system being operable automatically to maintain vehicle speed at the speed at which slip exceeding the prescribed value was detected.

In a still further aspect of the invention for which protection is sought there is provided a speed control system operable in an off-highway condition in which the system commands a powertrain to deliver a required torque to one or more wheels of the vehicle to maintain a prescribed set-speed over ground, in the event slip exceeding a prescribed value is detected when the system is accelerating the vehicle to a new increased set-speed, the system being operable automatically to maintain wheel speed at the speed at which slip exceeding the prescribed value was detected. This action may be taken until vehicle wheel slip is less than a prescribed value, at which point the system may control acceleration to enable the vehicle to achieve the new set-speed.

In each aspect described above, the system may be operable to resume acceleration once the slip event has ceased. Ceasing of the slip event may be determined by reference to a suitable signal such as a flag set by a traction control system (TCS) or stability control system (SCS) when the system is active, i.e. when the system is intervening to reduce slip. Once the TCS or SCS flag no longer indicates that the TCS or SCS system is active, the off-road speed control system may resume acceleration of the vehicle. In some embodiments the off-road speed control system may resume acceleration at one selected from amongst a prescribed period and a prescribed distance after excessive wheel slip is no longer detected. Other arrangements are also useful. Signal flags from other subsystems may also be useful.

In some embodiments, in the event it is detected that the vehicle is climbing or negotiating a step the off-read speed control system may be operable to maintain vehicle speed at the same speed as that at which the step was encountered, until the step has been negotiated. In some embodiments the system may maintain vehicle speed until one or more following wheels as well as one or more leading wheels have negotiated the step.

Acceleration may be limited in some embodiments due to detection of a wading event, in order to manage a bow wave and enhance vehicle control.

In some embodiments, an off-road speed control system may deal with slip events (or steps) detected at one or more following wheels of a vehicle (rear wheels in the case the vehicle is moving in a forward direction) differently from slip events defected at one or more leading wheels (front wheels in the case the vehicle is moving in the forward direction).

In some embodiments, an off-road speed control system may be operable to predict that a slip event (and/or encountering of a step in some embodiments) is likely at one or more trailing wheels based on identification of a slip event (or presence of a step) at one or more leading wheels at a time proportional to vehicle speed and wheelbase of the vehicle. The speed control system may be operable to manage slip or the mounting of a step at the one or more following wheels in such a manner as to reduce the effect on vehicle acceleration of any slip at the following wheels. It is to be understood that if both front and rear tyres on the same side pass over a particular patch of slippery surface and experience slip, vehicle acceleration may be compromised. Vehicle acceleration in response to a user request may be compromised until grip is restored. Thus in some embodiments the speed control system suspends acceleration of the vehicle to a higher speed for a time period or distance of travel sufficient to allow the following wheels to clear the location at which the slip event occurred or step was negotiated.

Some embodiments of the present invention have the advantage that an effect of wheel slip on vehicle acceleration when the speed control system is seeking to accelerate the vehicle may be reduced. In some embodiments vehicle composure may be improved substantially. This is at least in part because an amount of slip of one or more leading (and in some embodiments following) wheels may be reduced by suspending acceleration when slip of one or more leading wheels is defected. Furthermore, in some embodiments an amount of degradation suffered by an off-road surface due to one or more slip events may be reduced.

In some embodiments the off-road speed control system may be operable to control or otherwise influence gear and/or ratio selection, to ensure that the vehicle is traveling at low speeds off-road in a gear appropriate to avoid engine stalling and maintain suitable progress.

In some embodiments the off-road speed control system may be operable to work with Hill Descent Control (HDC)/ Hill Hold Assist, so as to optimise vehicle composure even when negotiating obstacles on steep gradients. In some embodiments, HDC/Hill Hold Assist braking commands override or otherwise take priority over commands by the off-road speed control system if the gradient on which the vehicle is traveling is greater than a pre-determined value and/or the speed is below a pre-determined threshold.

In some embodiments, the rate of acceleration employed by the speed control system when accelerating from a current cruising speed to a changed set-speed may be influenced by pre-set performance characteristics dictated by Terrain Response in dependence on Terrain Mode.

It is to be understood that in some embodiments a vehicle may be operated in off-road speed control mode in either forward or reverse driving directions.

According to a further aspect of the invention for which protection is sought, a vehicle speed control system for a vehicle having a plurality of wheels comprises; means for applying a torque to at least one of the plurality of wheels; means for receiving a user input of a target speed at which the vehicle is intended to travel; means for determining the nature of the terrain over which the vehicle is traveling; and means for determining whether the target speed is appropriate for the nature of the terrain over which the vehicle is traveling. The vehicle speed control system further comprises means for maintaining the vehicle at the target speed by applying torque to the at least one of the plurality of wheels only if the target speed is determined to be appropriate. When the system is required to accelerate the vehicle to achieve the target speed and the system detects a wheel slip event, the system is operable temporarily to suspend acceleration of the vehicle. Suspension of acceleration may be accomplished by suspension of the application of further torque to accelerate the vehicle.

As described above, in some embodiments, an off-road speed control system is provided that is arranged temporarily to hold vehicle speed or suspend temporarily vehicle acceleration in the event a slip event is defected when the speed control system is responding to a user request to accelerate the vehicle. In some embodiments vehicle speed is held at the speed at which the vehicle first encountered the slip event. In some embodiments the system is configured only to resume vehicle acceleration towards an increased set-speed chosen by the user once the slip event has ceased.

In this way, an off-road vehicle speed control system may accept an increase in set-speed but only attempt to achieve the set-speed where traction permits.

In some embodiments wheel speed is reduced such that wheel slip is limited to a prescribed amount, such as an amount from around 5% to around 20%. Other amounts are also useful. The amount may be responsive to vehicle speed, wheel articulation, vehicle attitude and/or selected TR mode. Other parameters are also useful in addition or instead.

In some embodiments, if slip of one or more wheels still occurs alter wheel speed is reduced, wheel speed is further reduced such that wheel slip falls within the prescribed amount described above.

In some embodiments a speed control system may be operable to detect when a vehicle may be traversing or crossing a gradient. In one scenario, if the vehicle is crossing a gradient that rises to the left of the vehicle, one or more uphill wheels such as front and rear left hand wheels may be subject to a lighter vehicle load than front and rear right hand wheels. In the example given, if the left hand wheels are slipping and an inclination or other sensor output indicates that a slope rises to the left of the vehicle, the speed control system may manage vehicle speed to reduce speed temporarily below a prescribed value, which may be lower than the user's set-speed (depending on the value of user set-speed).

In some embodiments, an off-road speed control system may be operable to predict that a slip event (and/or encountering of a step in some embodiments) is likely at one or more trailing wheels based on identification of a slip event (or presence of a step) at one or more leading wheels at a time proportional to vehicle speed and wheelbase of the vehicle. The speed control system may be operable to manage slip or the mounting of a step at the one or more following wheels in such a manner as to reduce the effect on vehicle acceleration of any slip at the following wheels. It is to be understood that if both front and rear tyres on the same side pass over a particular patch of slippery surface and experience slip, vehicle acceleration may be compromised. Vehicle acceleration in response to a user request may be compromised until grip is restored.

Embodiments of the invention have the advantage that an effect of wheel slip on vehicle acceleration when the speed control system is seeking to accelerate the vehicle may be reduced. In some embodiments vehicle composure may be improved substantially. This is at least in part because an amount of slip of one or more leading (and in some embodiments following) wheels may be reduced by suspending acceleration when slip of one or more wheels is detected. Furthermore, in some embodiments an amount of damage suffered by an off-road surface due to one or more slip events may be reduced.

In some embodiments the off-road speed control system may be operable to control or otherwise influence gear and/or ratio selection, to ensure that the vehicle is traveling at low speeds off-road in a gear appropriate to avoid engine stalling and maintain suitable progress.

In a system according to an aspect of the present invention, in the event a user requests an increase in target speed during a period in which the system has suspended temporarily further acceleration of the vehicle due to detection of a slip event, the system may be operable to accept an increase in set-speed. However, the system may temporarily delay an attempt to accelerate the vehicle to the new set-speed. The system may delay the attempt to accelerate the vehicle to the new set-speed until traction permits resumption of acceleration, as discussed above. Other arrangements are also useful.

In a method according to an aspect of the present invention, in the event a user requests an increase in target speed during a period in which further acceleration of the vehicle has been suspended temporarily due to detection of a slip event, the method may comprise accepting the increase in set-speed. However, the method may comprise temporarily delaying an attempt to accelerate the vehicle to the new set-speed. The method may comprise delaying the attempt to accelerate the vehicle to the new set-speed until traction permits resumption of acceleration, as discussed above. Other arrangements are also useful.

Within the scope of this application it is expressly intended that the various aspects, embodiments, examples and alternatives set cut in the preceding paragraphs, in the claims and/or in the following description and drawings, and in particular the individual features thereof, may be taken independently or in any combination. For example, features described with reference to one embodiment are applicable to all embodiments, unless such features are incompatible.

BRIEF DESCRIPTION OF THE DRAWINGS

One or more embodiments of the invention will now be described, by way of example only, with reference to the following figures in which.

DETAILED DESCRIPTION

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function block is made for ease of explanation of the manner of operation of a control system according to an embodiment of the present invention.

Figure 1:
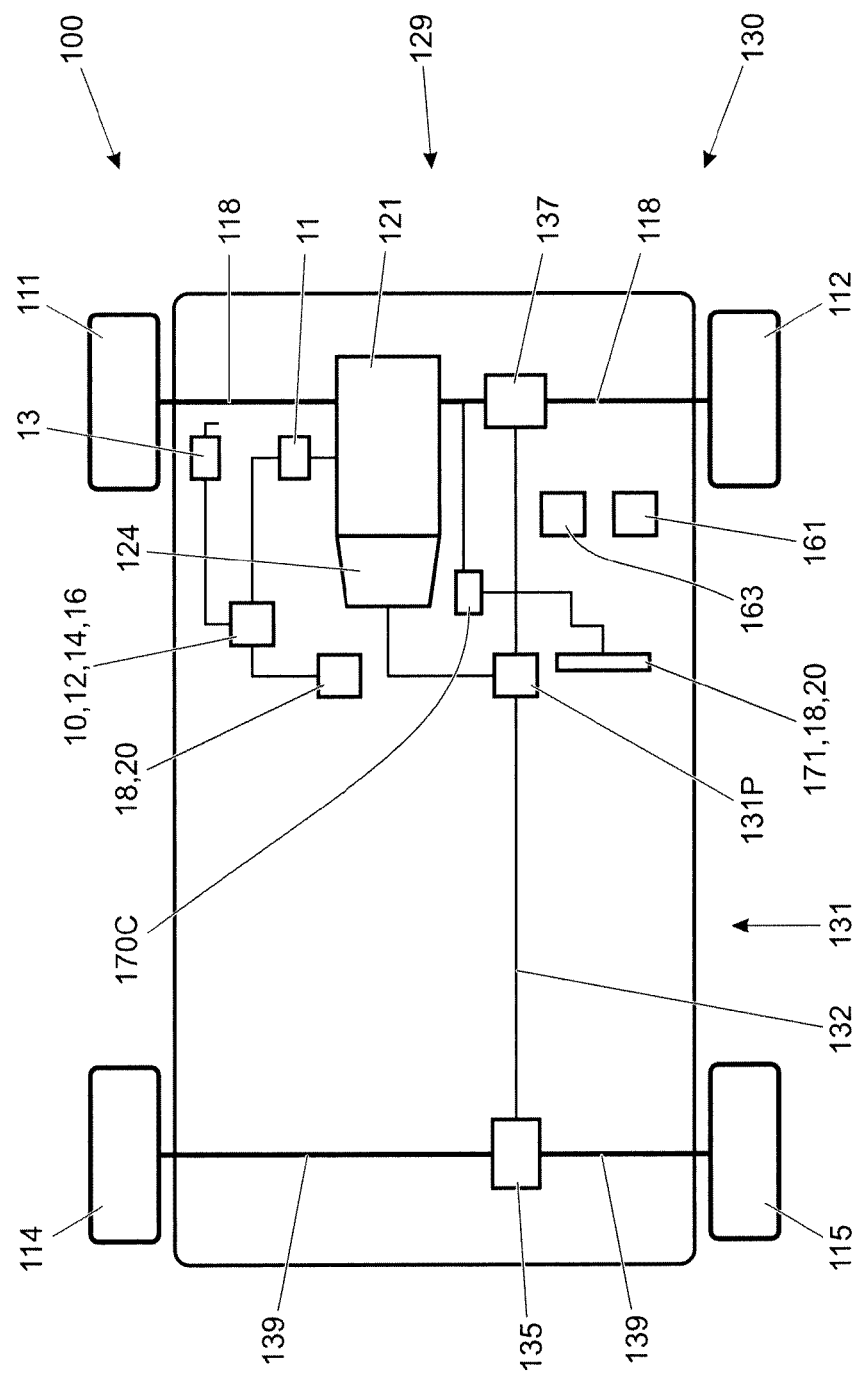
FIG. 1 is a schematic illustration of a vehicle according to an embodiment of the invention in plan view.
Figure 2:
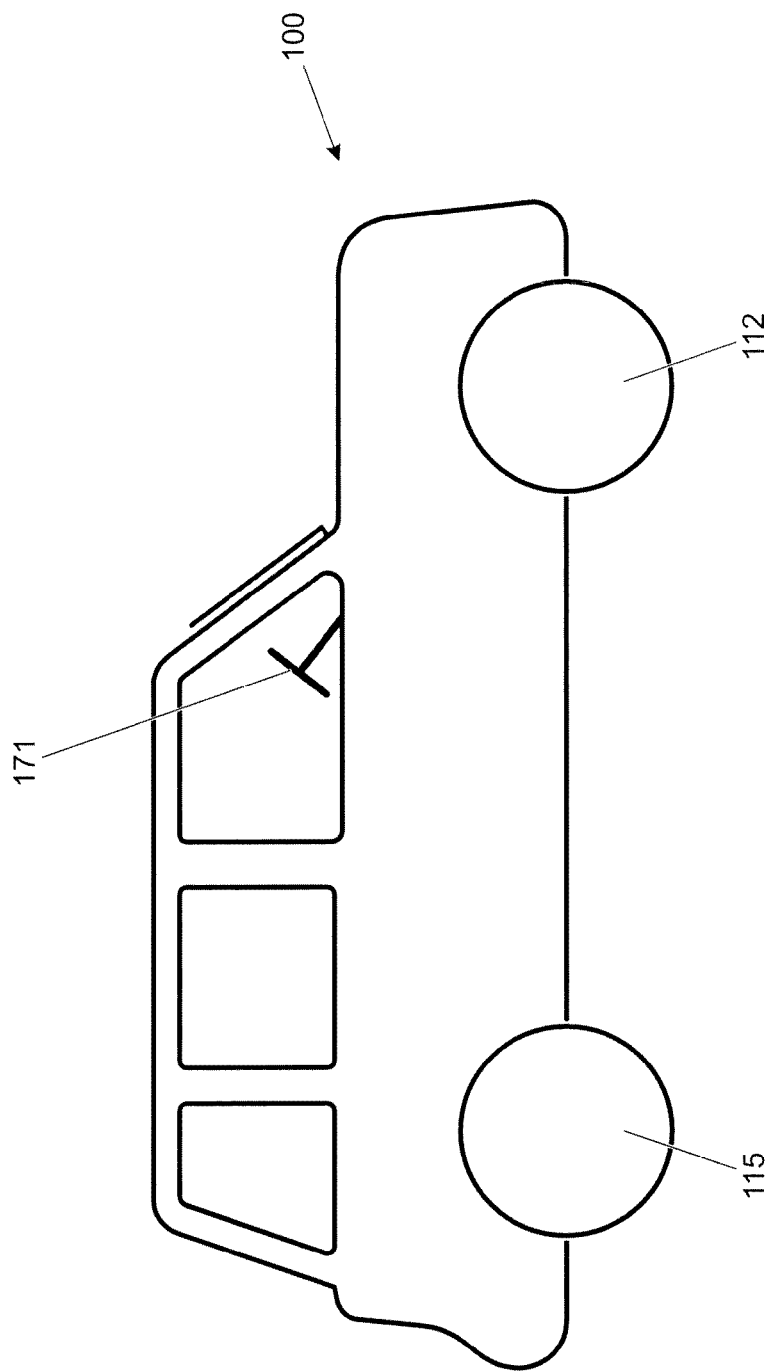
FIG. 2 shows the vehicle of FIG. 1 in side view.

FIG. 1 shows a vehicle 100 according to an embodiment of the invention having a powertrain 129. The powertrain 129 includes an engine 121 that is connected to a driveline 130 having an automatic transmission 124. The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing selectable two wheel drive or four wheel drive operation. It is to be understood that embodiments of the invention may be suitable for vehicles having more than four wheels or where only two wheels are driven, for example two wheels of a throe wheeled vehicle or four wheeled vehicle or a vehicle with more than four wheels, it is also to be understood that embodiments of the present invention are suitable for use in vehicles having a range of types of transmission such as a continuously variable transmission or manual transmission. Other types of transmission are also compatible with embodiments of the present invention.

A control system for the vehicle includes a central controller, referred to as the vehicle control unit (VCU) 10, a powertrain controller 11, a brake controller 13 and a steering controller 170C. The VCU 10 receives and outputs a plurality of signals to and from various sensors and subsystems (net shown) provided on the vehicle. The VCU 10 includes a low-speed prepress (LSP) control system 12 shown in FIG. 3 and a stability control system (SCS) 14, the latter being a known component of existing vehicle control systems. The SCS 14 improves handling of the vehicle 100 by detecting and reducing loss of traction. When a loss of steering control is defected, the SCS 14 automatically applies a braking system 22 to help to steer the vehicle in the direction the user wants to go. In the embodiment shown the SCS 14 is implemented by the VCU 10. In some alternative embodiments the SCS 14 may be implemented by the brake controller 13. Further alternatively, the SCS 14 may be implemented by a separate controller.

Figure 3:
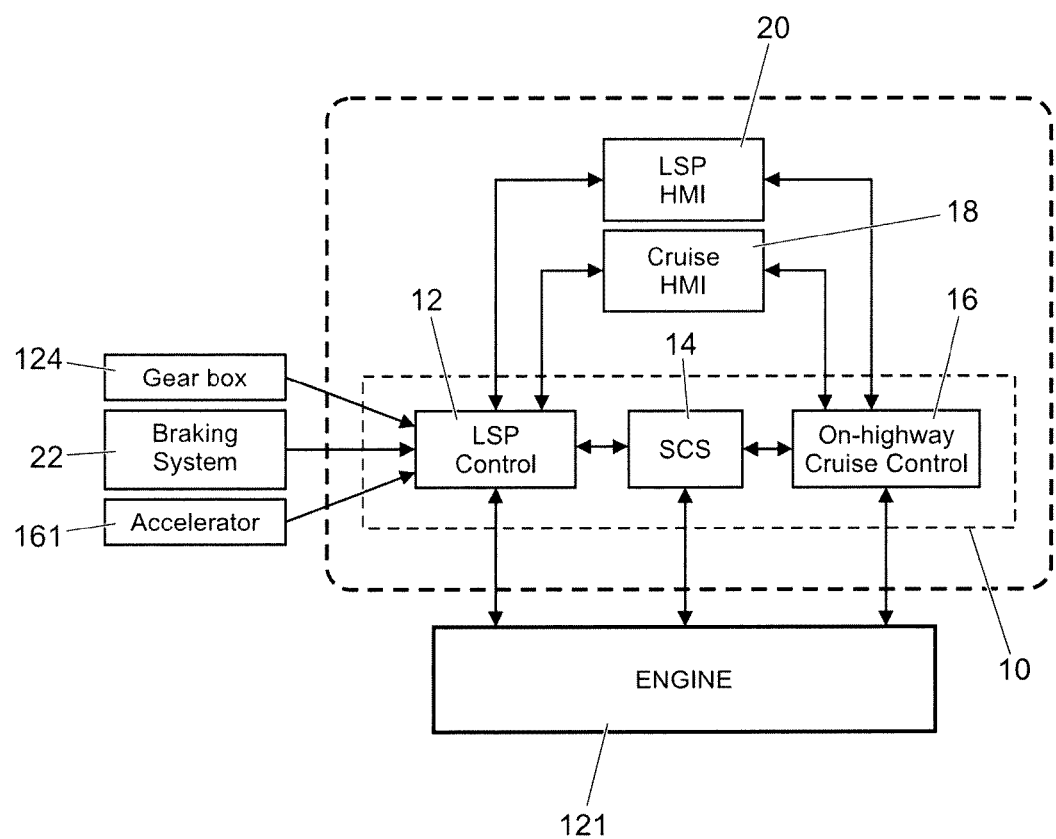
FIG. 3 is a high level schematic diagram of an embodiment of a vehicle speed control system according to an embodiment of the present Invention included in the vehicle of FIG. 1, showing a cruise control system and a low-speed progress control system.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks provide outputs indicative of, for example, DSC activity, TC activity, ABS activity, brake interventions on individual wheels and engine torque requests from the VCU 10 to the engine 121. All of the aforementioned events indicate that a wheel slip event has occurred. Other vehicle sub-systems such as a roll stability control system or the like may also be useful.

Figure 6:
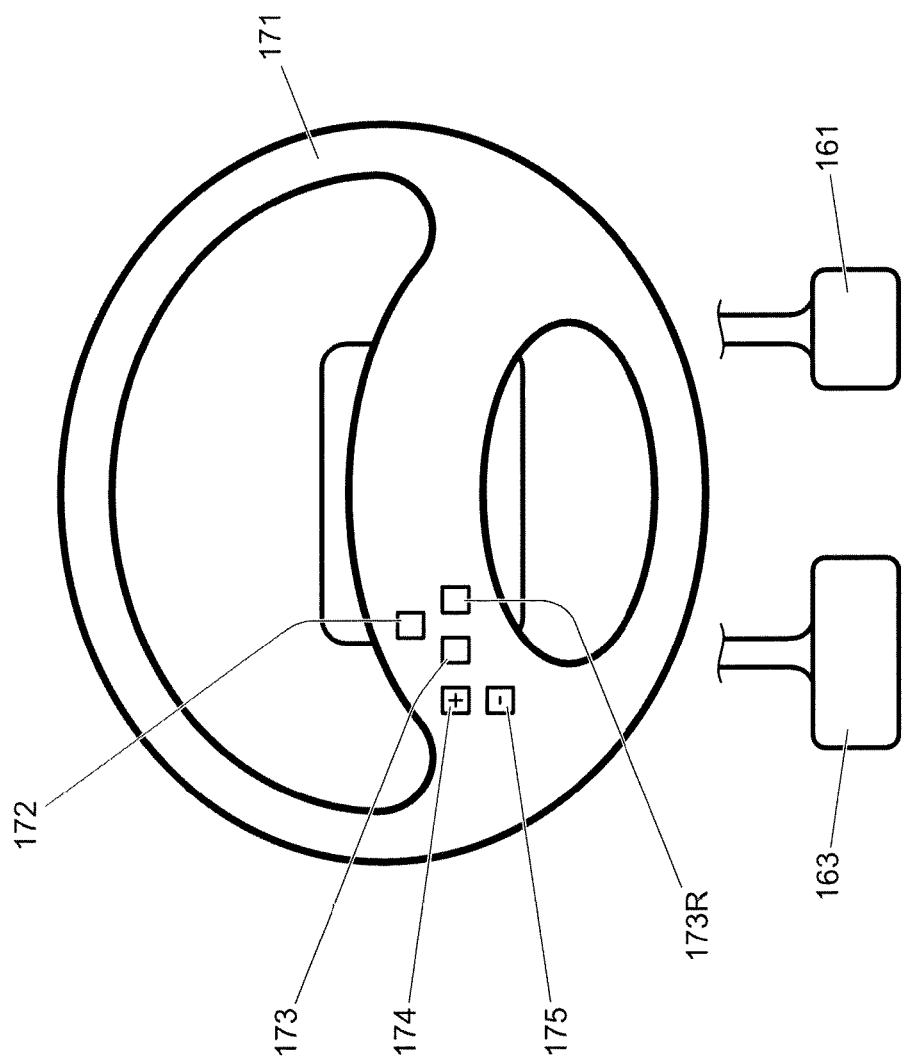
FIG. 6 illustrates a steering wheel and brake and accelerator pedals of the vehicle of FIG. 1.

The vehicle also includes a cruise control system 16 which is operable to automatically maintain vehicle speed at a selected speed when the vehicle is traveling at speeds in excess of 30 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 6). Depression of a 'set-speed' control 173 sets the set-speed to the current vehicle speed. Depression of a '+' button 174 allows the set-speed to be increased whilst depression of a '−' button 175 allows the set-speed to be decreased. In some embodiments, if the cruise control system 16 is not active when the '+' button 174 is depressed, the cruise control system 16 is activated.

The cruise control system 16 monitors vehicle speed and any deviation from the target vehicle speed is adjusted automatically so that the vehicle speed is maintained at a substantially constant value, typically in excess of 30 kph. In other words, the cruise control system is ineffective at speeds lower than 30 kph. The cruise control HMI 18 may also be configured to provide an alert to the user about the status of the cruise control system 16 via a visual display of the HMI 18.

The LSP control system 12 provides a speed-based control system for the user which enables the user to select a very low target speed at which the vehicle can progress without any pedal inputs being required by the user. This low-speed progress control function is not provided by the on-highway cruise control system 16 which operates only at speeds above 30 kph. Furthermore, known on-highway cruise control systems including the present system 16 are configured so that, in the event that the user depresses the brake (or the clutch in the case of a vehicle having a manual transmission), the cruise control function is cancelled and the vehicle reverts to a manual mode of operation which requires user pedal input to maintain vehicle speed. In addition, detection of a wheel slip event, as may be initiated by a loss of traction, also has the effect of cancelling the cruise control function.

The LSP control system 12 is operable to apply selective powertrain, traction control and braking actions to the wheels of the vehicle, collectively or individually, to maintain the vehicle 100 at the desired speed. It is to be understood that if the vehicle 100 is operating in a two wheel drive mode in which only front wheels 111, 112 are driven, the control system 12 may be prevented from applying drive torque to rear wheels 113, 114 of the vehicle 100.

The user inputs the desired target speed to the LSP control system 12 via a low-speed progress control HMI (LSP HMI) 20 (FIG. 1, FIG. 3). The LSP control system 12 operates at vehicle speeds typically below about 50 kph but does not activate until vehicle speed drops to below 30 kph, when the cruise control system of the vehicle becomes ineffective. The LSP control system 12 is configured to operate independently of a traction event, i.e. the system 12 does net cancel speed control upon detection of wheel slip. Rather, the LSP control system 12 actively manages vehicle behaviour and in this way, at least, differs from the functionality of the cruise control system 16, as will be described in further detail below.

The LSP control HMI 20 is provided in the vehicle cabin so as to be readily accessible to the user. The user of the vehicle is able to input to the LSP control system 12, via the LSP HMI 20, an indication of the speed at which the user desires the vehicle to travel (referred to as "the target speed"). The LSP HMI 20 also includes a visual display (not shown) upon which information and guidance can be provided to the user about the status of the LSP control system 12.

The LSP control system 12 receives an input from the braking system 22 of the vehicle indicative of the extent to which the user has applied braking by means of a brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of the output shaft from the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20 which is representative of the status of the LSP control function.

The cruise control HMI and the LSP HMI have input controls provided on a steering wheel 171 of the vehicle for convenience of operation by the user.

FIG. 6 shows the steering wheel 171 of the vehicle 100 of FIG. 1 in more detail, together with the accelerator and brake pedals 161, 163. The steering wheel 171 bears user operable input controls of the cruise control HMI 18 and LSP control HMI 20. As in the case of a conventional vehicle, the steering wheel 171 has a 'set-speed' control 173 depression of which enables a user to activate conventional cruise control system 16 to maintain the current vehicle speed. The wheel 171 also has a 'LSP' control activation button 172 and a resume button 173R. The resume button 173R may be used to control both an 'on-highway' cruise control system when driving on road, and the LSP control system 12 when driving off-road. The LSP control activation button 172 is used to activate the LSP control system 12 and the resume button 173R is used to command the system 12 to control the vehicle 100 to resume the previously set (user defined) set-speed.

If the vehicle is operating on-highway, depression of set-speed control 173 causes the cruise control system 16 to activate provided the current vehicle speed is within the operating range of the cruise control system 16. Depression of the '+' control 174 causes the cruise control system 16 to increase the set-speed whilst depression of the '−' control 175 causes the cruise control system 16 to decrease the set-speed. It will be appreciated that '+' and '−' controls may be on a single button in some arrangements, such as a rocker-type button. In some embodiments, the '+' control 174 may also function as a 'set-speed' control, in which case set-speed control 173 may be eliminated.

If the vehicle is operating off-highway, depression of set-speed control 173 causes the LSP control system 12 to activate and operate as described above, provided vehicle speed is within the operating range of the LSP control system 12.

In some embodiments, the system may further comprise a 'cancel' button operable to cancel speed control by the LSP control system 12. In some embodiments, the LSP system may be in either one of an active condition or a standby condition. In some embodiments the LSP control system 12 may be operable to assume an intermediate condition in which vehicle speed control by the LSP control system 12 is suspended but a hill descent control (HDC) system or the like may remain active if already active. Other arrangements are also useful.

With the LSP control system 12 active, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 active the '+' and '−' buttons 174, 175 are disabled. This latter feature may prevent changes in set-speed by accidental pressing of one of these buttons, for example when negotiating difficult terrain where relatively large and frequent changes in steering angle may be required. Other arrangements are also useful.

Figure 4:
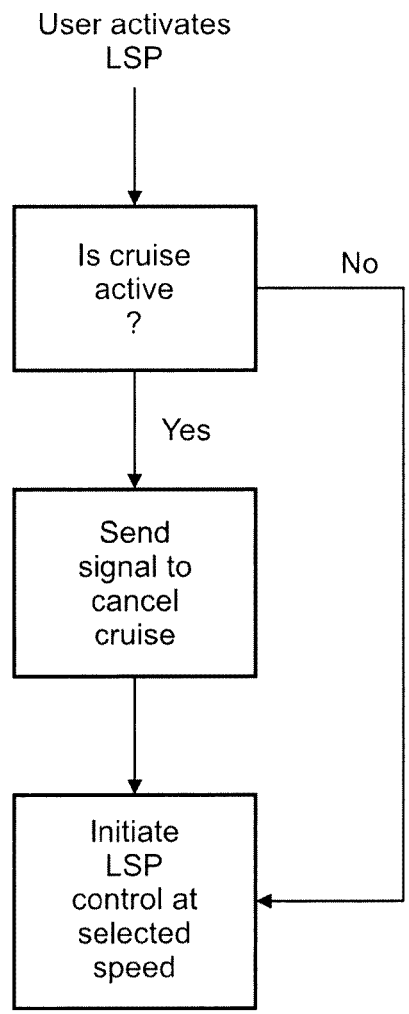
FIG. 4 is a flow diagram to illustrate the interaction between the cruise control system and the low-speed progress control system of FIG. 3.

FIG. 4 shows a flow process to illustrate the interaction between the cruise control system 18 and the LSP control system 12. If cruise control is active when the user tries to activate the LSP control system 12 via the LSP control HMI 20, a signal is sent to the cruise control system 16 to cancel the speed control routine. The LSP control system 12 is then initiated and the vehicle speed is maintained at the low target speed selected by the user via the LSP HMI 20. It is also the case that if the LSP control system 12 is active, operation of the cruise control system 16 is inhibited. The two systems 12, 16 therefore operate independently of one another, so that only one can be operable at any one time, depending on the speed at which the vehicle is traveling.

In some embodiments, the cruise control system 16 may hand over vehicle speed control to the LSP control system 12 if a user reduces set-speed 100 to a value within the operating speed range of the LSP control system 12. Similarly, in some embodiments the LSP control system 16 may hand over vehicle speed control to the cruise control system 16 if a user raises vehicle set-speed to a value that is within the operating range of the cruise control system 16. Other arrangements are also useful.

In some embodiments, the cruise control HMI 18 and the ISP control HMI 20 may be configured within the same hardware so that, for example, the speed selection is input via the same hardware, with one or more separate switches being provided to switch between the LSP input and the cruise control input.

Figure 5:
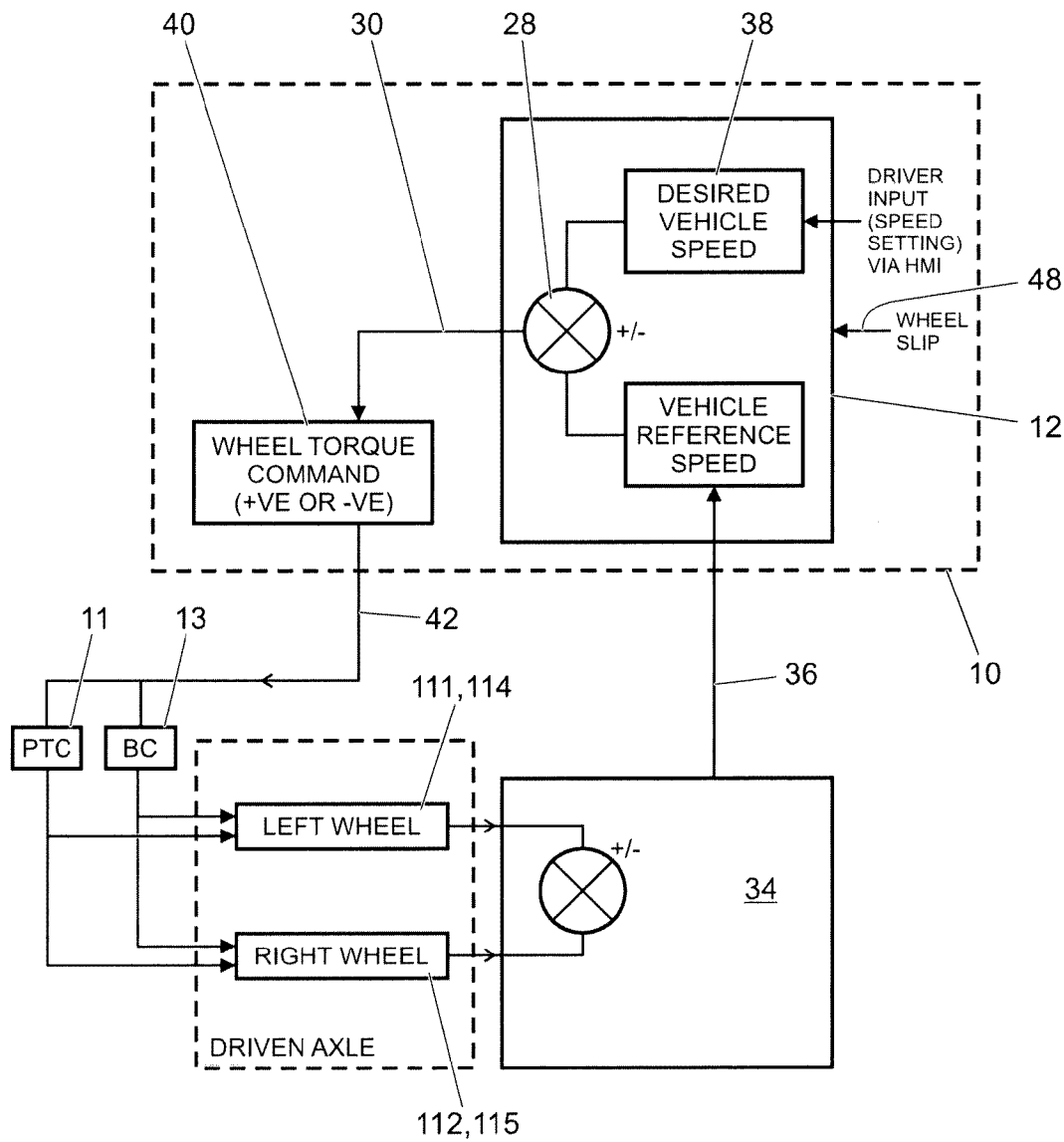
FIG. 5 is a schematic diagram of further features of the vehicle speed control system of FIG. 3.

FIG. 5 illustrates the means by which vehicle speed is controlled in the LSP control system 12. The speed selected by the user is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to foe applied to the vehicle wheels, or for a reduction in torque to be applied to the vehicle wheels, depending on whether the vehicle speed needs to be increased or decreased to maintain the speed that has been selected by the user. An increase in torque is generally accomplished by increasing the amount of powertrain torque delivered to a wheel. A decrease in torque to a value that is less positive or more negative may be accomplished by decreasing powertrain torque delivered to a wheel and/or by increasing a braking force on a wheel. It is to be understood that in some embodiments in which a powertrain 129 has an electric machine operable as a generator, negative torque may be applied by the powertrain 129 to one or more wheels, it is to be understood that a brake controller 13 may nevertheless be involved in determining whether brake torque is required to be provided by an electric machine of a powertrain 129, and whether brake torque should be provided by an electric machine or a friction-based foundation braking system 22.

An output 42 from the evaluator unit 40 is provided to the powertrain controller 11 and brake controller 13 which in turn control a net torque applied to the vehicle wheels 111-115. The net torque may be increased or decreased depending on whether there is a positive or negative demand for torque from the evaluator unit 40. Thus, in order to initiate application of the necessary positive or negative torque to the wheels, the evaluator unit 40 may command that additional power is applied to the vehicle wheels and/or that a braking force is applied to the vehicle wheels, either or both of which may be used to implement the change in torque that is necessary to maintain the target vehicle speed. In the illustrated embodiment the torque is applied to the vehicle wheels individually so as to maintain the target vehicle speed, but in another embodiment torque may be applied to the wheels collectively to maintain the target speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines. In some embodiments, the one or more electric machines may be operable as either a propulsion motor or a generator under the control of the powertrain controller 11. Thus the powertrain controller 11 may in some embodiments be controlled to apply more positive or more negative torque to one or more wheels by means of an electric machine.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of the vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the desired vehicle speed as input by the user, and continues to control automatically the torque applied across the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or the cruise control function reset.

A further embodiment of the invention (not shown) is one in which the vehicle is provided with a wheel slip signal 48 derived not just from a comparison of wheel speeds, but further refined using sensor data indicative of the vehicle's speed over ground. Such speed over ground determination may be made via global positioning (GPS) data, or via a vehicle mounted radar or laser based system arranged to determine the relative movement of the vehicle and the ground over which it is traveling. A camera system may be employed for determining speed over ground in some embodiments.

At any stage of the LSP control process the user can override the function by depressing the accelerator pedal 161 and/or the brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 5, this may be implemented by providing a wheel slip event signal 48 to the LSP control system 12 which is then managed by the LSP control system 12. In the embodiment shown in FIG. 1 the SCS 14 generates the wheel slip event signal 48 and provides it to the LSP control system 12 and cruise control system 16.

A wheel slip event is triggered when a loss of traction occurs at any one of the vehicle wheels. Wheels and tyres may be more prone to losing traction when traveling on snow, ice or sand and/or on steep gradients or cross-slopes, for example, or in environments where the terrain is more uneven or slippery compared with driving on a highway in normal on-road conditions. Embodiments of the present invention therefore find particular benefit when the vehicle is being driven in an off-road environment, or in conditions in which wheel slip may commonly occur. Manual operation by the user in such conditions can be a difficult and often stressful experience and may result in an uncomfortable ride. Embodiments of the present invention enable continued progress to be made at a relatively low target speed without the need for user intervention.

The vehicle 100 is also provided with additional sensors (not shown) which are representative of a variety of different parameters associated with vehicle motion and status. These may be inertial systems unique to the speed control system or part of an occupant restraint system or any other subsystem which may provide data from sensors such as gyros and/or accelerometers that may be indicative of vehicle body movement and may provide a useful input to the LSP control system 12. The signals from the sensors provide, or are used to calculate, a plurality of driving condition indicators (also referred to as terrain indicators) which are indicative of the nature of the terrain conditions over which the vehicle is traveling (for example, mud and ruts, sand, grass/gravel/snow). The signals are provided to the VCU 10 which determines the most appropriate control mode for the various subsystems on the basis of the terrain indicators, and automatically controls the subsystems accordingly. This aspect of the invention is described in further detail in our co-pending patent application nos. GB1111288.5, GB1211910.3 and GB1202427.9, the contents of each of which is incorporated herein by reference.

The sensors (not shown) on the vehicle include, but are not limited to, sensors which provide continuous sensor outputs to the VCU 10, including wheel speed sensors 34, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor for gradient estimator), a lateral acceleration sensor which may be part of the stability control system (SCS), a brake pedal position sensor, a brake pressure sensor, an accelerator pedal position sensor, longitudinal, lateral and vertical motion sensors, and water defection sensors forming part of a vehicle wading assistance system (not shown).

In other embodiments, only a selection of the aforementioned sensors may be used.

The VCU 10 also receives a signal from the steering controller 170C. The steering controller is in the form of an electronic power assisted steering unit (ePAS unit). The steering controller 170C provides a signal to the VCU 10 indicative of the steering force that is being applied to steerable road wheels 111, 112 of the vehicle 100. This force corresponds to that applied by a user to the steering wheel 171 in combination with steering force generated by the controller 170C.

The VCU 10 evaluates the various sensor inputs to determine the probability that each of the plurality of different control modes for the vehicle subsystems is appropriate, with each control mode corresponding to a particular terrain type over which the vehicle is traveling as noted above. The VCU 10 then selects which of the control modes is most appropriate and controls various vehicle parameters accordingly.

The nature of the terrain over which the vehicle is traveling (as determined by reference to the selected control mode) may also be utilised in the LSP control system 12 to determine an appropriate increase or decrease in drive torque to be applied to the vehicle wheels. For example, if the user selects a target speed that is not suitable for the nature of the terrain over which the vehicle is traveling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed (i.e. target speed), a visual indication of the speed constraint is provided to the user via the LSP HMI 20 to indicate that an alternative speed has been adopted.

It is to be understood that if a user employs the LSP control system 12 to negotiate a slippery surface or steep incline off-road and increases the set-speed as the vehicle 100 drives over the surface or ascends the slope, the VCU 10 may attempt to increase engine torque too aggressively resulting in a loss of traction.

Accordingly, the VCU 10 is configured to suspend acceleration of the vehicle 100 in the event that a slip event is defected when a user commands an increase in set-speed of the LSP control system 12. In this way, LSP control system 12 may accept an increase in set-speed but only attempt to achieve the set-speed where fraction permits.

In some embodiments in the event a slip event is detected, wheel speed is controlled such that wheel slip is limited to a prescribed amount, such as an amount from around 5% to around 20%. Other amounts are also useful. The amount may be responsive to vehicle speed, wheel articulation, vehicle attitude and/or selected TR mode. Other parameters are also useful in addition or instead.

In some embodiments, if slip of one or more wheels above a predetermined threshold continues after wheel speed is reduced, the speed of the one or more wheels is actively managed by controlling the net torque such that, wheel slip falls to a value within the prescribed range described above.

Figure 7:
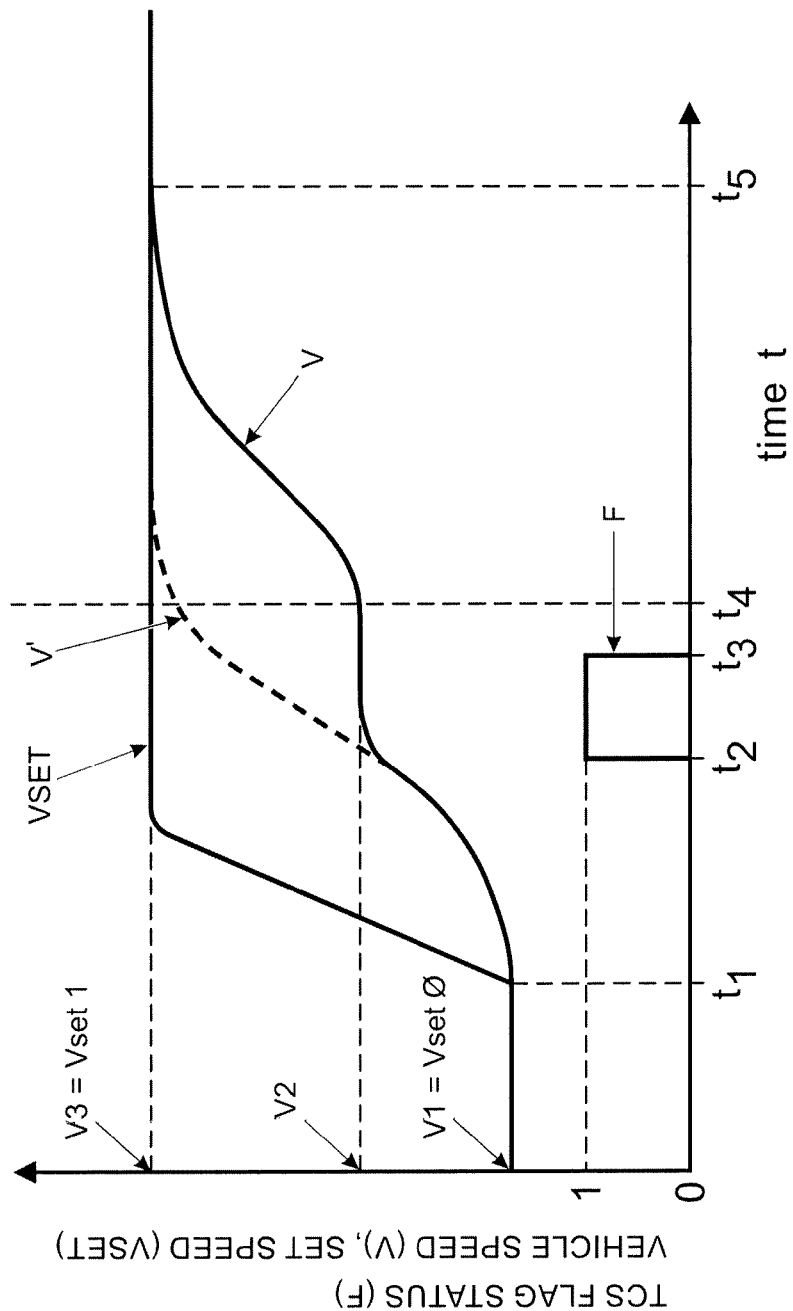
FIG. 7 is a plot of vehicle speed v, set-speed vset and fraction control system flag status as a function of time in a vehicle according to an embodiment of the present invention over the course of a portion of an example off-road journey.

FIG. 7 is a plot of vehicle speed v, vehicle set-speed vset and traction control system (TCS) flag status F as a function of time whilst a vehicle 100 according to an embodiment of the present invention is traversing varied terrain.

At time t=0 the vehicle 100 is traveling at speed v1 under the control of the LSP control system 12 with set-speed vset=v1. At time t=t1 later than time t=0 a user of the vehicle 100 increases the value of vset to a value vset=v3. The LSP control system 12 responds by controlling the vehicle 100 to accelerate from speed v1 to v3.

In the example shown, at time t=t2 the vehicle 100 experiences a traction control event in which a TCS system intervenes in vehicle progress control to manage excessive slip of one or more wheels 111-115. The TCS system may be triggered whilst the vehicle is accelerating for a number of different reasons, for example due to slippery level terrain or slippery inclined terrain.

A TCS system flag F is changed from a value F=0 to F=1 when intervention by the ICS system is triggered. The LSP control system 12 responds to the change in TCS flag status from F=0 to F=1 by suspending the request for further increase in positive torque to accelerate the vehicle 100. The system 12 holds the vehicle speed at the speed (v2) at which the vehicle was moving immediately prior to the event that triggered the TCS system to intervene.

If excessive slip is still present the LSP control system 12 may reduce wheel speed below the speed at which the vehicle was moving immediately prior to the event that triggered operation of the TCS system, i.e. below v2.

In some embodiments the system 12 holds vehicle speed at v=v2 until the TCS flag status reverts to F=0 indicating the slip event has ceased. The system 12 may then attempt to increase vehicle speed towards the earlier requested set-speed, v3. In some embodiments the system 12 may wait a prescribed period of time after F is set to zero before attempting to increase vehicle speed. This period may be a predetermined period in some embodiments or a period that is chosen responsive to one or more parameters such as vehicle speed, the period for which the TCS flag was set to F=1 and/or one or more other parameters in addition or instead. In the present embodiment the system 12 is configured to wait for a period of 1 s before attempting to increase vehicle speed again although other values are also useful. Thus once the TCS flag is reset to F=0 at time t=t3, the system 12 waits for 1 s before attempting to increase vehicle speed at time t=t4 to speed v3. It can be seen that at time t=t5 the vehicle 100 achieves the new set-speed vset=v3.

Trace v' of FIG. 7 shows by way of comparison predicted vehicle speed as a function of time t in the case that no slip events occur and the TCS flag F does not assume a value F=1 during the period of acceleration from v1 to v3.

Embodiments of the present invention have the advantage that vehicle composure during acceleration in off-road speed control mode may be improved. In some embodiments the effects of tyre erosion on off-road routes may be reduced, and both tyre wear and fuel consumption improved. Vehicle composure may be enhanced by adapting operation of the LSP control system 12 to available levels of grip and resisting over-revving of the engine. In addition, the LSP control system 12 is not caused to cancel during a traction control or slip event in contrast with known cruise control systems. It is to be understood that cancellation of vehicle speed control by means of the LSP system 12 may be a cause of significant distraction, inconvenience and additional workload when driving off-road.

In some embodiments, when acceleration of the vehicle 100 is recommenced following a slip event the LSP system 12 is configured to limit the rate of acceleration towards the increased set-speed to the rate of acceleration when the slip event was detected. This is so as to reduce a risk that a further slip event occurs due to the increased wheel torque applied in order to accelerate the vehicle.

Figure 8:
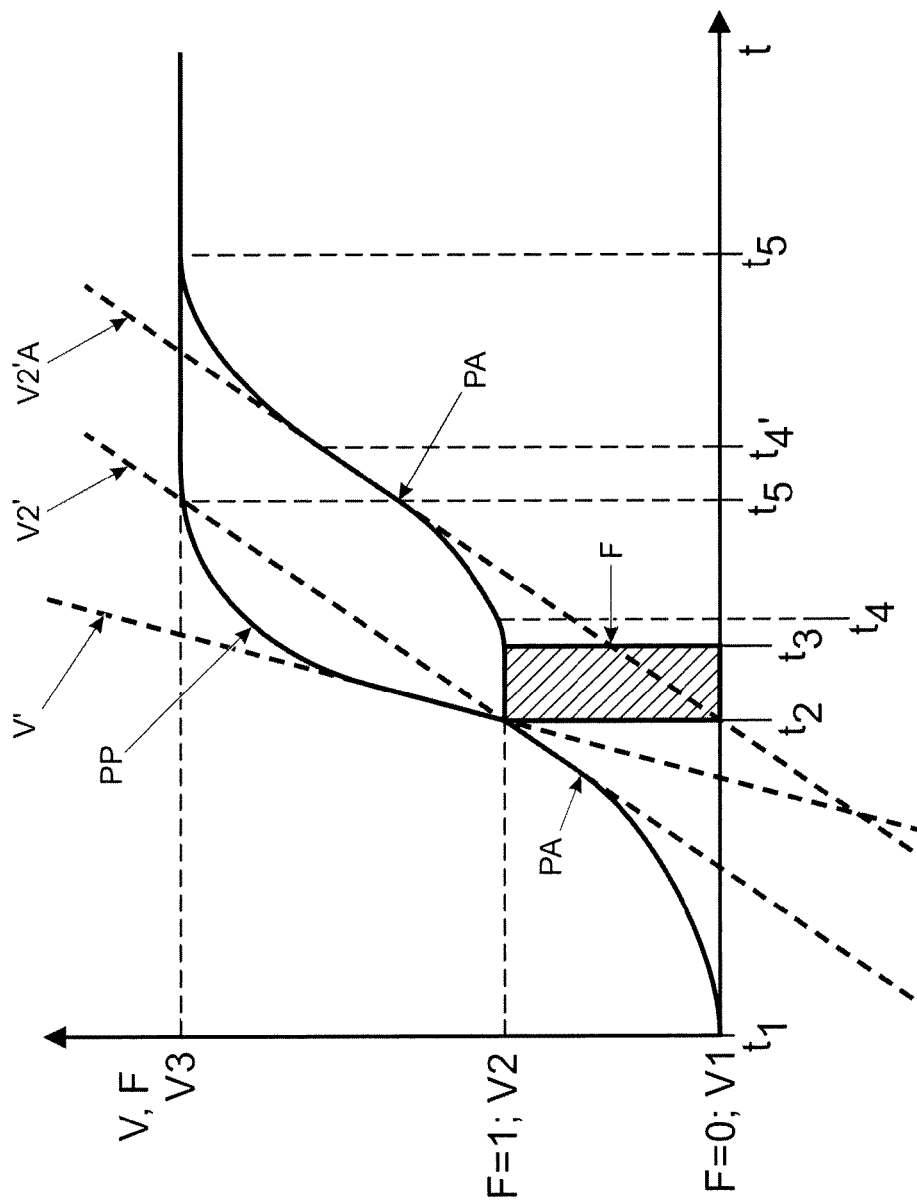
FIG. 8 is a plot of vehicle speed v as a function of time t following a request to increase the set-speed.

FIG. 8 is a plot of vehicle speed (plot PP) as a function of time t during a period in which the LSP control system 12 accelerates the vehicle 100 to a new set-speed in the absence of wheel slip events before the new set-speed is attained.

At time t=t1 the power-train 129 delivers sufficient drive torque to maintain the prevailing set-speed vset0=v1 at time t=t1. Immediately alter time t=t1 the user increases the set-speed to vset1=v3. In response the LSP control system 12 commands an increase in powertrain torque to accelerate the vehicle 100. The vehicle 100 attains the new set-speed v3 at time ts.

Trace PA shows the form of increase in vehicle speed v in the event a traction control event occurs whilst the vehicle is being accelerated to the new set-speed v3.

The powertrain 129 increases the amount of torque developed thereby and accelerates the vehicle 100 such that at time t=t2 the vehicle has attained speed v2, the speed increasing at a rate v2'. The rate v2' is given by the gradient of line v2' in FIG. 8, which is tangential to the plot of v as a function of time at time t=t2.

At time t=t2 the TCS flag is set to F=1 indicating the occurrence of a slip event. The LSP control system 12 responds by suspending further acceleration of the vehicle 100. The LSP control system 12 attempts to maintain vehicle speed at a value v2 during the period for which F=1.

At time t=t3 the TCS flag is set back to F=0 indicating the slip event has ceased. In response, the LSP control system 12 commands an increase in powertrain torque to accelerate the vehicle to the speed vset1 after expiry of is from the moment F is set to zero, i.e. at time t4. Following the slip event, the LSP control system 12 limits the maximum allowable rate of acceleration of the vehicle 100 to the rate prevailing at time t=t2, i.e. to a value v2'. As can be seen from FIG. 8, the greatest rate of increase of speed allowed by the LSP control system 12 following the end of the slip event at time t=t3 occurs at time t=t4' and is given by the gradient of line v2'A. Because the LSP control system 12 limits the rate of acceleration of the vehicle 100, the gradient of line v2'A does not exceed that of line v2', and in the example shown is substantially equal to that of line v2'. The LSP system 12 is configured to blend the rate of increase of speed from substantially zero at time t4 to the value v2'A (which is substantially equal to v2' as noted above).

As the vehicle speed approaches vset1 the rate of acceleration reduces until vset1 is reached at time t=t5.

As noted above, trace PP of FIG. 8 shows predicted vehicle speed under similar conditions if the slip event had not occurred. It can be seen that in the particular example shown, the greatest rate of increase of speed would have occurred at a time between times t2 and t3 and have been of value v'. As can be seen from FIG. 8, v'>v2'=v2'A.

It can be seen therefore in the example described above that after detection of the slip event, the LSP control system 12 limits the maximum rate of acceleration following resumption of acceleration to that experienced by the vehicle when the slip event occurred.

Embodiments of the present invention have the advantage that a risk that a vehicle suffers repeated slip events whilst accelerating from one set-speed to a higher set-speed is reduced. Repeated slip events can cause degradation of a driving surface and render the surface more difficult for vehicles subsequently to negotiate. For example if a convoy of vehicles is traversing slippery terrain and a lead vehicle degrades the surface of the terrain due to repeated wheel slip events, a following vehicle may find it more difficult to negotiate the terrain due to the change to the terrain caused by the lead vehicle. By limiting a rate of increase of powertrain torque following a slip event whilst accelerating the vehicle to a new set-speed, a risk that repeated slip events occur may be reduced.

Some embodiments may also be useful when accelerating a vehicle from rest and a wheel slip event occurs. For example, a wheel slip event may occur as the vehicle accelerates to the set-speed (or a minimum operating speed) from rest, resulting in suspension of acceleration of the vehicle until the slip event has ceased.

In some embodiments, the ISP control system 12 is configured to allow acceleration of the vehicle to be resumed following a slip event involving a leading wheel once the following wheels of the vehicle have traveled a distance corresponding to that required for the following wheels of the vehicle to pass the region of terrain where the leading wheel experienced slip. This reduces a risk that, a following wheel suffers excessive wheel slip. In some embodiments this distance may be proportional to the length of the wheelbase of the vehicle. This distance may be substantially equal to the length of the wheelbase of the vehicle in some embodiments.

In the embodiment illustrated, the LSP control system 12 is operable to receive a user input of a required change in set-speed even during a period in which acceleration of the vehicle 100 has been suspended. However, in the present embodiment the system 12 does not attempt to accelerate to the new set-speed until suspension of acceleration has been lifted. This feature allows a driver to update the set-speed according to the prevailing driving conditions even during a period in which acceleration has been suspended, reducing driver workload. Other arrangements are also useful.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires, in particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle speed control system for a vehicle having a plurality of wheels, the vehicle speed control system comprising:
   an input device for receiving a user input of a target speed at which the vehicle is intended to travel; and
   a vehicle controller for commanding application of torque to one or more wheels of the vehicle,
   wherein the system is configured such that when the system is required to accelerate the vehicle to achieve the target speed and the system detects a wheel slip event, the system is operable to temporarily suspend further acceleration of the vehicle until the system lifts the suspension of further acceleration and, when the suspension of further acceleration is lifted, the system is operable automatically to inhibit slip by resuming acceleration at a rate limited to a rate of acceleration of the vehicle when the wheel slip event was detected.

2. The system as claimed in claim 1 configured automatically to lift the suspension of further acceleration of the vehicle once a prescribed one or more conditions are met.

3. The system as claimed in claim 1 wherein the prescribed one or more conditions are selected from amongst the conditions that the wheel slip event has ceased, that the vehicle has traveled a prescribed distance or for a prescribed time period since the wheel slip event involving the one or more wheels ceased, and that the vehicle has traveled a prescribed distance or for a prescribed time period since the wheel slip event involving one or more leading wheels ceased.

4. The system as claimed in claim 3 wherein the prescribed one or more conditions include the condition that the vehicle has traveled the prescribed distance since the wheel slip event involving the one or more leading wheels ceased, the prescribed distance corresponding to a distance between leading and following wheels of the vehicle, or that the vehicle has traveled for a prescribed time period since the wheel slip event involving the one or more leading wheels ceased, the prescribed time period corresponding to a time required for the following wheels to reach a position at which the wheel slip event involving the one or more leading wheels ceased.

5. The system as claimed in claim 1 configured to maintain a substantially constant speed when further acceleration is temporarily suspended.

6. The system as claimed in claim 5 wherein the substantially constant speed corresponds to the speed at which the vehicle was traveling when the wheel slip event was detected.

7. The system as claimed in claim 1 configured to resume acceleration at a prescribed rate.

8. The system as claimed in claim 7 wherein the prescribed rate corresponds to the rate of acceleration of the vehicle when the wheel slip event was detected.

9. The system as claimed in claim 1, comprising:
   a vehicle speed sensor for determining a current speed at which the vehicle is traveling,
   wherein the vehicle controller is configured to compare the current speed with the target speed and provide an output indicative of a difference between the current speed and the target speed; and
   wherein the vehicle controller is configured to evaluate the torque to be applied to at least one of the vehicle wheels in dependence on the output.

10. The system as claimed in claim 9, operable to command application of torque to at least two wheels of the vehicle substantially simultaneously.

11. The system as claimed in claim 10, operable to command application of torque to at least four wheels of the vehicle substantially simultaneously.

12. The system as claimed in claim 9, further being operable to:
    inhibit operation of the vehicle control system in an event that the current speed is determined to be in excess of a predetermined threshold speed.

13. The system as claimed in claim 12, wherein the predetermined threshold speed is between 25 and 35 kph.

14. The vehicle speed control system as claimed in claim 13, wherein the predetermined threshold speed is substantially 30 kph.

15. The system as claimed in claim 12, wherein the predetermined threshold speed is a first, lower threshold speed, the vehicle speed control system further being operable to:
    compare the current vehicle speed with a second, higher threshold speed and, when the current vehicle speed is less than the second, higher threshold speed, hold the vehicle speed control system in a wait state and initiate vehicle speed control only once the current vehicle speed is reduced to below the first, lower threshold speed.

16. The system as claimed in claim 15 wherein the second, higher threshold speed corresponds to a speed above which the speed control system is cancelled, wherein when the vehicle speed subsequently falls below the second, higher threshold speed the system does not assume the wait state.

17. The system as claimed in claim 12, comprising a cruise control system which is operable to maintain vehicle speed at speeds above the predetermined threshold speed.

18. The system as claimed in claim 17, wherein the cruise control system is operable to suspend operation of the system on receiving the slip detection output signal.

19. The system as claimed in claim 1, comprising:
sensors for detecting a nature of terrain over which the vehicle is traveling;
the system being operable to determine for determining whether the target speed is appropriate for the nature of the terrain over which the vehicle is traveling; and
maintain the vehicle at the target speed by commanding application of torque to the at least one of the plurality of wheels only when the target speed is determined to be appropriate.

20. A system for a vehicle having a plurality of wheels, the vehicle control system comprising:
a powertrain and a brake system controller for applying torque to at least one of the plurality of wheels;
a traction control system controller for detecting a wheel slip event between any one or more of the plurality of the wheels and ground over which the vehicle is traveling when the vehicle is in motion and for providing a slip detection output signal in the wheel slip event; and
an input device for receiving a user input of a target speed at which the vehicle is intended to travel,
wherein the system is configured such that when the system is required to accelerate the vehicle to achieve the target speed and the system detects the wheel slip event, the system is operable to temporarily suspend further acceleration of the vehicle until the wheel slip event is no longer detected, and when the wheel slip event is no longer detected, the system is operable automatically to inhibit slip by resuming acceleration at a rate limited to a rate of acceleration of the vehicle when the wheel slip event was detected.

21. A vehicle speed control system for a vehicle having a plurality of wheels, the vehicle speed control system comprising:
an input device for receiving a user input of a target speed at which the vehicle is intended to travel; and
a vehicle controller for commanding application of torque to one or more wheels of the plurality of wheels of the vehicle,
wherein the system is configured such that when the system is required to accelerate the vehicle to achieve the target speed and a wheel slip event is detected, the system is operable to temporarily maintain the vehicle speed at a value substantially equal to that at which the vehicle was traveling until the system lifts a suspension of further acceleration and, when the suspension of further acceleration is lifted, the system is operable automatically to inhibit slip by resuming acceleration at a rate limited to a rate of acceleration of the vehicle when the wheel slip event was detected.

22. A vehicle, comprising:
a vehicle speed control system, the vehicle speed control system including:
an input device for receiving a user input of a target speed at which the vehicle is intended to travel; and
a vehicle controller for commanding application of torque to one or more wheels of the vehicle,
wherein the system is configured such that when the system is required to accelerate the vehicle to achieve the target speed and the system detects a wheel slip event, the system is operable to temporarily suspend further acceleration of the vehicle until the system lifts the suspension of further acceleration and, when the suspension of further acceleration is lifted, the system is operable automatically to inhibit slip by resuming acceleration at a rate limited to a rate of acceleration of the vehicle when the wheel slip event was detected.

23. A method of controlling a speed of a vehicle having a plurality of wheels, the method comprising:
applying torque to at least one of the plurality of wheels;
detecting, by a vehicle controller, a wheel slip event between any one or more of the plurality of wheels and a ground over which the vehicle is traveling when the vehicle is in motion and providing a slip detection output signal in the wheel slip event;
receiving a user input of a target speed at which the vehicle is intended to travel; and
accelerating, by the vehicle controller, the vehicle to achieve the target speed,
whereby in an event that the wheel slip event is detected, the method comprises suspending temporarily further acceleration of the vehicle until the wheel slip event is no longer detected; and
when the wheel slip event is no longer detected, inhibiting slip by lifting the suspension and automatically resuming acceleration at a rate limited to a rate of acceleration of the vehicle when the wheel slip event was detected.

24. The method as claimed in claim 23 wherein the step of resuming acceleration comprises resuming acceleration at a rate corresponding to a rate of acceleration of the vehicle when the wheel slip event was first detected.

* * * * *